United States Patent [19]

Silver et al.

[11] 3,922,464

[45] Nov. 25, 1975

[54] REMOVABLE PRESSURE-SENSITIVE ADHESIVE SHEET MATERIAL

[75] Inventors: Spencer F. Silver, White Bear Lake; Louis E. Winslow, Stillwater; Alvin R. Zigman, Woodbury, all of Minn.

[73] Assignee: Minnesota Mining and Manufacturing Company, St. Paul, Minn.

[22] Filed: Feb. 6, 1973

[21] Appl. No.: 330,016

Related U.S. Application Data

[63] Continuation-in-part of Ser. No. 257,240, May 26, 1972, abandoned.

[52] U.S. Cl. ............... 428/355; 427/207; 427/208; 428/500
[51] Int. Cl.² ........................................... C09J 7/04
[58] Field of Search .... 117/122 P, 122 PF, 122 PA, 117/76 A, 68.5, 161 UT, 161 UZ; 260/29.3 R; 428/355, 500; 427/207, 208

[56] References Cited
UNITED STATES PATENTS

| | | | |
|---|---|---|---|
| 2,795,515 | 6/1957 | Lavanchy | 117/122 X |
| 3,024,221 | 3/1962 | Le Fevre et al. | 260/887 X |
| 3,547,852 | 12/1970 | Burke | 117/122 X |
| 3,551,479 | 12/1970 | Emmons | 260/485 |
| 3,579,490 | 5/1971 | Kordzinski et al. | 117/122 X |
| 3,660,431 | 5/1972 | Hatch et al. | 117/122 |
| 3,725,122 | 3/1973 | Reinhard et al. | 117/122 X |

*Primary Examiner*—Bernard D. Pianalto
*Attorney, Agent, or Firm*—Alexander, Sell, Steldt & Delahunt

[57] ABSTRACT

A flexible self-sustaining backing is coated with a stable viscous copolymer latex formed from monomers of (1) major amounts of certain alkyl acrylates, (2) minor amounts of certain emulsifier monomers, and (3) if desired, minor amounts of zwitterionic monomers, and the water evaporated from the latex to leave a tacky and pressure-sensitive adhesive. When tape prepared in this way is applied to enameled or lacquered substrates, it can be removed without leaving an adhesive residue, even after extended exposure to heat and light. Other sheet materials (e.g., floor tile, carpeting, label stock, etc.) are similarly removable when provided with this adhesive.

10 Claims, No Drawings

REMOVABLE PRESSURE-SENSITIVE ADHESIVE SHEET MATERIAL

CROSS-REFERENCE TO RELATED APPLICATION

This application is a continuation-in-part of application Ser. No. 257,240, filed May 26, 1972, and now abandoned.

This invention relates to normally tacky and pressure-sensitive adhesive tape.

The term "pressure-sensitive" is commonly used to designate a distinct category of adhesive tapes and adhesives which in solvent-free form are aggressively and permanently tacky at room temperature and firmly adhere to a variety of dissimilar surfaces upon mere contact without the need of more than finger or hand pressure. Such adhesives are characterized by what has been termed a "four-fold balance" of adhesion, cohesion, stretchiness, and elasticity and are thus to be distinguished from various other products which possess some but not all of these properties.

Recognition of the need for an inexpensive, impervious, conformable pressure-sensitive tape for paint masking in spray painting of automobiles led to the invention of paper masking tape in the 1920's. A good masking tape must bond firmly at 5°–50°C. under light pressure, resist the penetration of paints, lacquers or enamels completely and protect the underlying surface from contamination or staining. Sharp color separation must be effected when two-color painting is done, the edges of the tape bonding so well that the paint will not seep in and produce a ragged line. Many lacquers and enamels are dried or cured at temperatures ranging from 50°C. to 200°C., and masking tapes must stay in place and may even be required to support protecting aprons at these temperatures. On subsequent removal the tape must strip cleanly without leaving a residue or stain, and the backing must not become embrittled to the point that breakage will occur during removal.

Early pressure-sensitive adhesives were based on organic solvent solutions of natural or synthetic rubber tackified by some type of resinous material. These so-called "rubber-resin" adhesives are still widely used in masking tape, one major reason being that they can be formulated so as not to display adhesion buildup, i.e., their adhesion to the substrate does not increase to the point where the tape cannot be removed cleanly, even after exposure to the heat of a drying or curing oven.

The problem of adhesion buildup is particularly undesirable in the normal use of masking tape. Other situations where such adhesion increase causes difficulties include application of temporary protective tapes to a substrate (e.g., polymethylmethacrylate sheets, stainless steel panels, etc.), adhesion of vinyl tile squares or carpeting to a floor (where it may be necessary to replace a damaged tile or carpet portion), bumper stickers (which are notorious for their lack of removability), temporary labels, etc.

Despite the widespread use of rubber-resin adhesives in the manufacture of tape products, the virtues of wholly synthetic pressure-sensitive adhesives have been recognized. Thus, for example, adhesive systems based on acrylic acids or esters can be tailored to fit specific needs, are of more consistently uniform quality from batch to batch, and are both clearer and less prone to stain than rubber-resin adhesives. After application to a substrate, however, the initial adhesion of an acrylate adhesive tends to increase greatly. While this characteristic is useful in some situations, it is intolerable for masking tape and many other products where removability is important. Like the rubber-resin adhesives, the acrylate adhesives are typically applied from organic solvent solution.

If one skilled in the art were to list the desirable attributes of a pressure-sensitive adhesive, he would include the following:

1. It should be available in latex form, to avoid the necessity of using organic solvents in preparing compositions for coating and the subsequent problems involved in removing such solvents.
2. The latex should be stable at widely varying temperatures, even when subjected to mechanical agitation of the type likely to be encountered in a coating process.
3. The latex viscosity should be consistently high enough that a uniform and predictably sufficient layer of adhesive can be applied.
4. The adhesive should be entirely synthetic, to permit maximum predictability of its characteristics from batch to batch and to reduce possibilities of staining.
5. When used on masking tape, and the tape thereafter applied to a lacquered or enameled surface, adhesion should not increase to the point that the tape cannot be removed cleanly.

These desiderata indicate that some attempt should be made to modify acrylate adhesives to impart the qualities which such adhesives lack, and considerable research work has been devoted to doing so. Prior to the present invention, however, such efforts have been unsuccessful.

Acrylate copolymer adhesives can be prepared by either solution or emulsion polymerization techniques, and it might seem reasonable simply to utilize the emulsion polymer for coating. Unfortunately, however, the coating of acrylic ester copolymer emulsions is fraught with a large number of technical difficulties; even with fastidious control of coating apparatus, etc., there is considerable danger of emulsion breakdown, foaming, and similar difficulties. Further, it is extremely difficult to maintain a latex viscosity high enough to permit uniformly coating a backing with the amount of polymer necessary to make a useful tape product. Equally important is the previously noted fact that acrylate pressure-sensitive adhesives tend to increase in adhesion to a substrate. Earlier attempts to correct these problems have not been encouraging.

In summary, prior to the present invention, no wholly synthetic adhesive system was known which satisfied the commercial appetites of tape manufacturers and their customers for removable tape.

The present invention utilizes an entirely synthetic pressure-sensitive adhesive latex which is not only stable at a wide range of temperatures but which is also resistant to breakdown when subjected to mechanical agitation of the type encountered in coating operations. The novel latex has a viscosity which is sufficiently high (e.g., 500–2000 cps) to permit coating a layer which, after evaporation of the water, may range up to 5 mils (about 125 microns) thick, all without problems of excessive fluidity, uneven coating, and the like. It requires no expensive or environment-polluting organic solvents, and it is unnecessary to provide elaborate temperature and operational controls for the tape manufacture. A film formed from a dried layer of the latex displays the four-fold balance of properties needed by a pressure-sensitive adhesive.

An unexpected and entirely unobvious benefit of adhesives made in accordance with the present invention is the absence of adhesion increase, or "buildup", when tape made with such adhesives is applied to an enameled or lacquered substrate. This adhesion stability is observed even when the tape, after application, is subjected to temperatures of 250°F. (about 120°C) for 1 hour or for longer periods of time at lower temperatures, exposed to ultraviolet light, etc.

The invention constitutes an improvement over conventional normally tacky and pressure-sensitive adhesive-coated sheet material, such as masking tape, wherein a self-sustaining backing sheet is provided with a layer of normally tacky and pressure-sensitive adhesive firmly adherently bonded to at least one fact thereof. The improvement resides in the use of a novel copolymer adhesive of monomers, 100 parts by weight of adhesive consisting essentially of (a) 88–99 parts by weight of at least one terminally unsaturated vinyl monomer, (b) 0.2–5 parts by weight of at least one emulsifier monomer and (c) 0–10 parts by weight of at least one zwitterionic monomer, the total of (b) + (c) being 1 to 12 parts by weight. In the presently preferred compositions, the terminally unsaturated vinyl monomer amounts to 95–98 parts by weight and the emulsifier monomer amounts to at least one part by weight.

In the novel adhesive, 70–100 weight percent of the terminally unsaturated vinyl monomer is selected from the class of non-tertiary alkyl acrylates wherein each alkyl group has at least half of its carbon atoms in a single chain and the average length of the alkyl chain is more than 4 and not more than 12.

The acrylic acid esters useful in the practice of this invention are the esters of alcohols which, on a mole basis contain an average of more than 4 to not more than 12 carbon atoms, preferably from 6 to 12 carbon atoms, the majority of the esters being derived from alcohols containing 4–12 carbon atoms. Examples of suitable esters are the acrylic acid esters of non-tertiary alcohols such as: 2-methylbutanol, 3-methylbutanol, 2-ethyl-butanol, 4-methylpentanol, 2-propyl-pentanol, n-hexanol, 2-methylhexanol, 4-methylhexanol, 2-hexanol, 2-ethylhexanol, 4-ethylhexanol, 4-methyl-2-pentanol, 2,3,4-triethylhexanol, 2-ethyl-3-methylhexanol, 2-heptanol, 3-heptanol, 3-methylheptanol, 2-ethylheptanol, 2-methyl-4-ethylheptanol, n-octanol, iso-octanol, n-decanol, n-dodecanol, 10-chloro-decanol, 6-methoxyhexanol, etc., and mixtures thereof.

If the average number of carbon atoms in the longest alkyl chain of the alcohols from which the acrylate esters are derived does not exceed 4, the adhesive tends to be harsh, raspy, and difficult to adhere quickly. If, however, at least 70% of the terminally unsaturated vinyl monomer is a suitable acrylate, short chain methacrylate monomers can be incorporated. If the average number of carbon atoms in the longest alkyl chain exceeds 12, the adhesive tends to become waxy and lack sufficient adhesion.

For various reasons it may be desirable to incorporate, as part of the terminally unsaturated vinyl monomeric portion of the adhesive system, any of several modifying comonomers which are not emulsifier monomers. For example, acrylonitrile imparts firmness and solvent resistance, styrene and alpha-methyl styrene impart firmness and improve peel adhesion, t-butyl styrene improves tack, methylmethacrylate makes the adhesive firmer, octyl vinyl ether softens the adhesive, vinyl acetate improves adhesion to certain plastic surfaces, etc.

As used herein, the term "emulsifier monomer" means any vinyl-unsaturated, homopolymerizable (as in the presence of a free radical initiator) surfactant which has both a hydrophobic and a hydrophilic moiety, contains at least 5 but not more than 40 carbon atoms and is nonionic and/or water-dispersible. (In other words a nonionic surfactant may, but need not, be water-dispersible; anionic and cationic surfactants must be water-dispersible.)

Sulfoesters of alpha-methylene carboxylic acids, the salts of which may be employed as emulsifier monomers, include 2-sulfoethyl acrylate, 2-sulfoethyl methacrylate, 2-sulfoethyl α-ethylacrylate, 2-sulfoethyl α-hexylacrylate, 2-sulfoethyl α-cyclohexylacrylate, 2-sulfoethyl α-chloroacrylate, 2-sulfo-1-propyl acrylate, 2-sulfo-1-butyl acrylate and methacrylate, 3-sulfo-2-butyl acrylate and methacrylate, 2-methyl-1-sulfo-2-propyl acrylate and methacrylate, 3-bromo-2-sulfo-1-propyl acrylate, 3-chloro-2-sulfo-1-propyl acrylate, 3-chloro-2-sulfo-1-butyl acrylate, 3-methoxy-2-sulfo-1-propyl acrylate, 2-sulfo-cyclohexyl acrylate, 2-phenyl-2-sulfo-ethyl acrylate and 4-sulfo-1-butyl acrylate, 6-(sulfophenoxy) hexyl acrylate and methacrylate. The preparation of such materials is disclosed in U.S. Pat. No. 3,024,221, the disclosure of which is incorporated herein by reference.

Sulfato-esters of alpha-methylene carboxylic acids, the salts of which may be employed as emulsifier monomers, include 3-sulfato-2-hydroxy-1-propyl methacrylate.

Carboxy-terminated alkyl esters of alpha-methylene carboxylic acids, the salts of which may be employed as emulsifier monomers, include 11-methacryloxyundecanoic acid.

Sulfoalkyl allyl ethers, the salts of which may be employed as emulsifier monomers, include 3-sulfo-2-hydroxy-1-propyl allyl ether.

Acrylamide alkane sulfonates, the salts of which may be employed as emulsifier monomers, include acryloamido-2-methyl propane sulfonate.

Vinyl alkyl phosphonate esters, the salts of which may be employed as emulsifier monomers, include vinyl octyl phosphonate.

Monoalkyl ethers of oxyalkylene esters of carboxylic acids which may be employed as emulsifier monomers, include ethylene glycol monomethyl ether acrylate.

Alkylaryloxypolyalkoxy esters which may be employed as emulsifier monomers, include octylphenoxypolyethoxyacrylate.

It is often desirable to incorporate a minor amount of zwitterion monomers into pressure-sensitive adhesives used in preparing tapes of the present invention. Inclusion of, e.g., 3–5% or more of such monomers greatly improves the cohesive and shear properties of the adhesive, and even smaller amounts have beneficial effects. If a zwitterion monomer is included, however, any comonomers should be unreactive therewith. For example, if an aminimide zwitterion is included, acrylic acid should generally be avoided, lest a reaction take place which gels the copolymer latex.

In the context of this invention, zwitterion monomers are zwitterionic compounds possessing free radically polymerizable unsaturated groups and are described in many texts, such as I. Finor, "Organic Chemistry", Page 486 (1956). As used herein the expression "zwitterion monomer" refers only to compounds such as betaines and aminimides which are internally neutralized and does not include compounds such as aminoacids, which have ionic hydrogens or other ions that provide for external satisfaction of the charge satisfied only at their isoelectric point in aqueous solution. Preferred zwitterion monomers useful in preparing the pressure-sensitive adhesives of the present invention may be represented by the three general structural formulas:

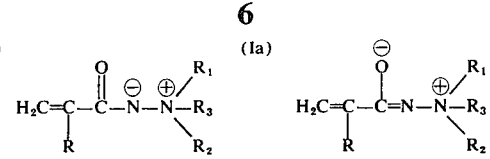

and zwitterions of structural Formula II with IIa:

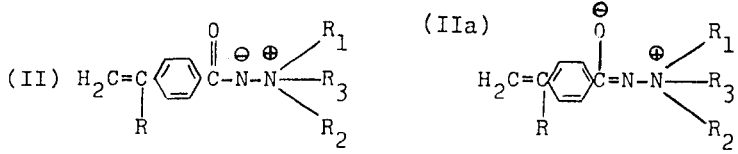

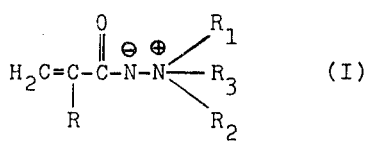

(I)

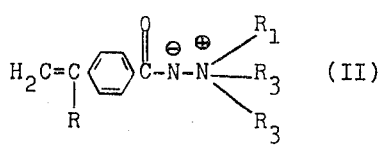

(II)

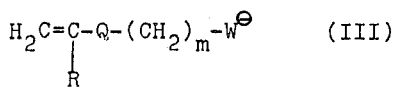

(III)

wherein R represents a hydrogen atom, a lower alkyl group containing 1 to 10 carbon atoms, or a phenyl group;

$R_1$ and $R_2$ represent either (a) the same or different lower alkyl groups containing 1 to 10 carbon atoms or (b) a single divalent group that together with the nitrogen atom forms a heterocyclic ring;

$R_3$ represents a group which is lower alkyl, phenylalkyl, 2-hydroxyalkyl, 2,3-dihydroxy alkyl, 2-hydroxyalkylphenyl, 2,3-dihydroxyalkylphenyl, 2-hydroxyalkoxyalkyl, or 2-hydroxyalkylphenylether wherein the alkyl group contains 1 to 12 carbon atoms inclusively;

Q represents either

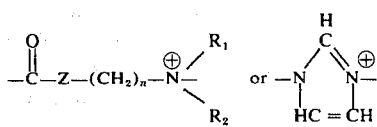

Z represents —O—, —S—, or —NH—
$n$ is an integer from 1 to 5 inclusive,
$m$ is an integer from 1 to 8 inclusive, and
$W^-$ represents a negatively charged radical selected from the group consisting of Examples of preferred zwitterion monomers represented by structural Formulas I and Ia include: trimethylamine methacrylimide; trimethylamine acrylimide; triethylamine methacrylimide; tributylamine methacrylimide; 1,1-dimethyl-1-(2-hydroxypropyl)amine methacrylimide; 1,1-dipropyl-1-(2-hydroxypropyl)amine acrylimide; 1,1-dimethyl-1-(2,3-dihydroxypropyl)amine methacrylimide; 1,1-dipropyl-1-(2-hydroxybutyl) amine acrylimide; 1,1-dimethyl-1-(2-hydroxyoctyl)amine methacrylimide; 1,1-dimethyl-1-(2-hydroxy-3-phenoxypropyl)amine methacrylimide; 1,1-dimethyl-1-(2-hydroxy-3-methoxypropyl) amine methacrylimide and 1,1-dimethyl-1-(2-hydroxy-2-phenylethyl)amine methacrylimide. Although not strictly classifiable within Formula I, aminimides derived from unsaturated polybasic acids (e.g., fumaric acid) are analogous and are also useful in the invention.

Preferred zwitterion monomers represented by structural Formulas II and IIa include: trimethylamine 4-vinylbenzimide; trimethylamine 4-isopropenylbenzimide; 1,1-dimethyl-1-(2-hydroxypropylamine) 4-isopropenylbenzimide; and 1,1-dimethyl-1-(2-hydroxy-3-phenoxypropyl)amine 4-vinylbenzimide.

Preferred zwitterion monomers represented by structural Formula III include: 3-[(2-acryloxyethyl) dimethylammonium] propionate betaine; 3-[(2-acryloxyethyl) dimethylammonium] propane sulfonate betaine; 3-[(2-methacryloxyethyl)dimethylammonium] propionate betaine; 3-[(2-methacryloxyethyl)dimethylammonium] propane sulfonate betaine.

Zwitterion monomers represented by structural Formula I are aminimides and may be prepared by any suitable method, such as that described in Belgian Patent No. 714,629. Aminimide monomers represented by structural Formula I which contain hydroxyl groups may be prepared in accordance with the process described in U.S. Pat. No. 3,485,806, Belgian Patent 714,629, Slagel, *J. Org. Chem.* 33 (4), 1374 (1968), and Culbertson et al., *Macromolecules* 1 (3), 224 (1968).

Zwitterion monomers represented by structural Formula II are aminimides and may be prepared by any suitable procedure, such as that described by Culbert-

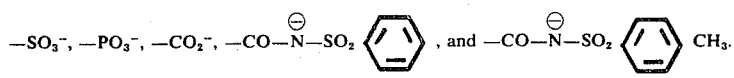

It is to be understood that zwitterions of structural formula I are probably tautomeric with another structure (Ia):

son et al., *J. Poly, Sci.:* Part A-1 6, 2197 (1968).
Zwitterion monomers represented by structural Formula III are betaines and may be prepared in accordance with the process described in U.S. Pat. No. 2,777,872 for the carboxy-betaines and in U.S. Pat. No. 3,411,912 for sulfobetaines. The preparation of still other monomers of the general Formula III is described in French Patent No. 1,518,218.

In evaluating an adhesive, to determine whether it can successfully be incorporated in a removable pressure-sensitive adhesive tape product, the following procedure is employed. A creped paper having a basis weight of 30 lbs. per papermaker's ream (about 50 g/m$^2$) is saturated with a styrene:butadiene rubber-resin composition according to the procedure described in U.S. Pat. No. 2,236,527, the details which are incorporated herein by reference. The latex adhesive to be evaluated is then knife-coated on one face of the saturated backing, with the knife set approximately 5 mils (about 125 microns) above the surface of the backing, the web being drawn through the equipment at 6 feet (about 2 meters) per minute. The coated web is passed through a 3-tier air circulating oven with temperatures set respectively at 180°F. (82°C.), 220°F. (112°C.) and 200°F. (93°C.) to evaporate the water from the latex. The resultant pressure-sensitive adhesive sheet material is wound convolutely upon itself in roll form, slit to widths of three-fourths inch (about 19 mm), and wound on individual cores to provide rolls of tape.

To determine whether excessive adhesion buildup occurs, 1-inch × 3-inch × ⅛-inch (about 2.5 mm × 7.6 mm × 3 mm) glass microscope slides are dipped in hexamethoxymethyl melamine (commercially available from American Cyanamid Co. under the registered trademark designation "Cymel" 301 resin) in which has been incorporated 4% paratoluene sulfonic acid curing catalyst, the acid being added as a 20% solution in methyl ethyl ketone. After removal from the coating solution, the slides are placed in a 300°F. (about 150°C.) circulating air oven for 10 minutes and cooled to room tmeperature. Strips of tape prepared as described in the preceding paragraph are then applied to one face of the coated microscope slide and rolled down with two passes of a 4½ lb. (about 2 kg) rubber roller to insure intimate contact. The taped slides are placed in a 250°F. (about 120°C.) air circulating oven for 1 hour, removed, and allowed to cool to room temperature. One end of the tape is then doubled back on itself at 180° to extend beyond the opposite end of the microscope slide, the exposed end of the slide clamped in one pair of jaws of a tensile testing machine and the strip of tape clamped in the other pair of jaws. The jaws are then separated at a rate of 12 inches (50.5 cm) per minute and, if desired, the force required to remove the tape noted. The surface of the coated slide exposed when the tape is removed, is then noted visually to determine whether there has been any adhesive transfer. If no such transfer is noted, the adhesive is considered to be one which resists adhesion buildup and removal is termed "clean". If a barely detectable adhesive track, or "ghost" remains on the panel, the adhesive is considered "acceptable".

For purposes of the adhesion test just described, cured hexamethoxymethyl melamine resin is selected both because many commercial enamels contain either melamine or melamine derivatives, and because results correlate well with actual performance on a variety of substrates.

Understanding of the invention will be further enhanced by referring to the subsequent illustrative but non-limitative examples, in which all parts are by weight unless otherwise noted.

EXAMPLE 1

A 2,000-ml resin flask fitted with a stirrer, condenser, thermometer, and tube for introducing nitrogen, was charged with the following materials:

| Component | Weight, grams |
|---|---|
| De-oxygenated deionized water | 454 |
| Iso-octyl acrylate (mixture of the acrylates of the isomeric octyl alcohols) monomer | 328 |
| Vinyl acetate modifying comonomer | 56 |
| 1,1-dimethyl-1-(2-hydroxyoctyl)amine methacrylimide zwitterion monomer | 4.0 |
| 10% solution of sodium-2-sulfoethyl-methacrylate (emulsifier monomer) | 40 |
| Sodium dodecyl benzene sulfonate (external emulsifier) | 8.0 |

The flask was then purged with nitrogen, after which 0.25 gram of sodium bisulfite and 0.8 gram of potassium persulfate were added. While maintaining a nitrogen atmosphere, the resultant emulsion was heated to 40°C., where polymerization occurred, as evidenced by an exotherm to 85°C. After approximately one hour, a stable emulsion had been formed, the room temperature Brookfield viscosity at 60 r.p.m., using a No. 2 spindle, being 800 cps. Analysis indicated that the reaction had proceeded at least 95% of the way to completion, resulting in an emulsifier monomer content in the finished polymer of 1%, and a zwitterion monomer concentration of 1%.

Although not absolutely essential to the preparation of satisfactory copolymer adhesion emulsions, it is considered desirable to employ small amounts of external emulsifier, especially where short chain emulsifier monomers are used. Such emulsifiers, which are commonly employed in the preparation of many copolymer latices, assist in initial suspension of the monomeric reactants and tend to result in a more homogeneous appearing emulsion than when they are omitted. On the other hand, excessive amounts of such external emulsifiers tend to impart undesirable water-sensitivity make the emulsion more difficult to dry, and adversely affect adhesive properties. As the chain length of the emulsifier monomer increases, its initial emulsifying ability increases and the need for an external emulsifier diminishes.

It was found that the copolymer emulsion of this example could be successfully coated with both knife coating and roll coating equipment at normal room temperature without any unusual handling precautions, and the coating process could be continued for an extended period of time without any evidence of foaming or polymer coagulation. When subjected to the test described in the preceding section of this disclosure, it was found that the adhesive adhered well to the hexamethoxymethyl melamine-coated microscope slide but could be removed with no adhesive transfer after being subjected to one hour aging at 250°F. (about 120°C.).

In the interest of simplifying the understanding of this invention, the following table sets forth examples of copolymer emulsions made in substantially the same way as was employed in Example 1; as in Example 1, 2 parts of sodium dodecyl benzene sulfonate was utilized as an external emulsifier. In each case, the emulsion was coated on a masking tape backing and the resultant tape shown to adhere well to a cured layer of hexamethoxymethyl melamine and to be removable therefrom, without adhesive transfer, after aging 1 hour at 250°F. (about 120°C.).

In the tabulated examples, the following abbreviations have been employed in the interest of compressing data to more readily understandable form:

Acrylate monomers
   IOA--iso-octyl acrylate
   nBA--n-butyl acrylate
   nDDA--n-dodecyl acrylate
   2MBA--2-methyl butyl acrylate
Modifying comonomers
   ACN--acrylonitrile
   α-MS--alpha-methyl styrene
   IBA--iso-butyl acrylate
   MMA--methyl methacrylate
   OVE--octyl vinyl ether
   tBS--tertiary butyl styrene
   VIO--vinyl iso-octoate
   VOAc--vinyl acetate
Emulsifier monomers
   AMPS/Et$_3$N--triethyl amine salt of acryloamido-2-methyl propane sulfonate
   EGMEA--ethylene glycol monomethyl ether acrylate
   SEM (Et$_3$)N--triethylammonium 2-sulfoethyl methacrylate
   SEM K--potassium 2-sulfoethyl methacrylate
   SEM Li--Lithium 2-sulfoethyl methacrylate
   SEM Na--sodium 2-sulfoethyl methacrylate
   SEM NH$_4$--ammonium 2-sulfoethyl methacrylate
   SEM Rb--rubidium 2-sulfoethyl methacrylate
   TX-45A--octylphenoxypolyethoxyacrylate, viz., $C_9H_{19}-\langle O \rangle -O-(CH_2CH_2O)_4-CH_2CH_2O-\overset{O}{\overset{\|}{C}}-CH=CH_2$ VOPNa--sodium vinyl octyl phosphonate
286--sodium -11-methacryloxyundecanoate
296--sodium 6-(acryloxy)hexoxybenzene sulfonate
695--ammonium 3-sulfato-2-hydroxy-1-propyl methacrylate
720--sodium 3-sulfo-2-hydroxyl-1-propyl allyl ether Zwitterionic monomers
   BOA--1,1-dimethyl-(2-hydroxy-3-butoxypropyl) amine methacrylamide
   FBA·HCl--bis-[1,1-dimethyl-1(2-hydroxypropyl)] amine fumarylimide monohydrochloride
   DHA 3--1,1-dimethyl-1-(2-hydroxypropyl)amine methacrylimide
   DHA 3P--1,1-dimethyl-1(2-hydroxy-3-phenoxypropyl)amine methacrylimide
   DHA 8--1,1-dimethyl-1-(2-hydroxyoctyl)amine methacrylimide
   DHA 10--1,1-dimethyl-1-(2-hydroxydecyl)amine methacrylimide
   DHA 12--1,1-dimethyl-1-(2-hydroxydodecyl)amine methacrylimide
   PB--3[(2-methacryloxyethyl)dimethylammonium] propionate betaine
   SB--3[(2-methacryloxyethyl)dimethylammonium] propane sulfonate betaine
   TMA--trimethylamine methacrylimide
   TVB--trimethylamine 4-vinyl benzimide
   VIPSB--vinyl imidazole propane sulfonate betaine

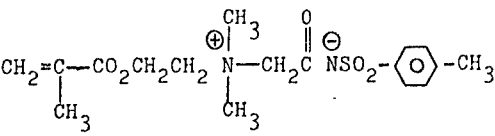

265--$CH_2=\underset{CH_3}{\overset{CH_3}{C}}-CO_2CH_2CH_2\overset{CH_3}{\underset{CH_3}{\overset{\oplus}{N}}}-CH_2\overset{O}{\overset{\|}{C}}\overset{\ominus}{N}SO_2-\langle O \rangle -CH_3$

TABLE I

| Example | Acrylate monomer Type | Parts | Modifying comonomer Type | Parts | Emulsifier monomer Type | Parts | Zwitterion monomer Type | Parts | Removability |
|---|---|---|---|---|---|---|---|---|---|
| Control | IOA:IBA | 85:15 | — | — | — | — | — | — | Soft adhesive—split and left residue on panel |
| 2 | " | 86:13 | — | — | SEMNa | 1 | — | — | Clean |
| 3 | " | 84:13 | — | — | " | " | PB | 2 | Clean |
| 4 | " | " | — | — | " | " | SB | " | Clean |
| 5 | " | " | — | — | " | " | 265 | " | Clean |
| 6 | " | " | — | — | " | " | TMA | " | Acceptable |
| 7 | " | " | — | — | " | " | VIPSB | " | Clean |
| 8 | " | " | — | — | " | " | DHA 8 | " | Clean |
| 9 | " | " | — | — | " | " | DHA 10 | " | Clean |
| 10 | " | " | — | — | " | " | DHA 12 | " | Clean |
| 11 | " | " | — | — | SEMK | " | DHA 8 | " | Clean |
| 12 | " | " | — | — | SEMLi | " | DHA 8 | " | Clean |
| 13 | " | " | — | — | SEMRb | " | DHA 8 | " | Clean |
| 14 | " | " | — | — | SEM(Et)$_3$N | " | DHA 8 | " | Acceptable |
| 15 | " | " | — | — | SEM NH$_4$ | " | DHA 8 | " | Clean |
| 16 | " | " | — | — | AMPS (Et)$_3$N | " | DHA 8 | " | Clean |
| 17 | " | " | — | — | EGMEA | " | DHA 8 | " | Clean |
| 18 | " | " | — | — | VOPNa | " | DHA 8 | " | Clean |
| 19 | " | " | — | — | 286 | " | DHA 8 | " | Clean |
| 20 | " | " | — | — | TX-45A | " | TVB | " | Clean |
| 21 | IOA:nBA | " | — | — | SEMNa | " | DHA 8 | " | Clean |
| 22 | IOA:IBA | " | — | — | 720 | " | DHA 8 | " | Acceptable |

TABLE I-continued

| Example | Acrylate monomer Type | Acrylate monomer Parts | Modifying comonomer Type | Modifying comonomer Parts | Emulsifier monomer Type | Emulsifier monomer Parts | Zwitterion monomer Type | Zwitterion monomer Parts | Removability |
|---|---|---|---|---|---|---|---|---|---|
| 23 | '' | '' | — | — | 695 | '' | DHA 8 | '' | Acceptable |
| 24 | '' | 81:12 | — | — | SEMNa | 5 | DHA 8 | '' | Acceptable |
| 25 | '' | 84.5:13.3 | — | — | '' | 0.2 | DHA 8 | '' | Acceptable |
| 26 | IOA | 92 | Styrene | 5 | 296 | 1 | DHA 8 | '' | Acceptable |
| 27 | '' | '' | '' | '' | SEMNa | '' | BOA | '' | Clean |
| 28 | '' | '' | VIO | '' | '' | '' | DHA 8 | '' | Clean |
| 29 | '' | '' | αMS | '' | '' | '' | DHA 8 | '' | Clean |
| 30 | '' | '' | tBS | '' | '' | '' | DHA 8 | '' | Clean |
| 31 | '' | '' | MMA | '' | '' | '' | DHA 8 | '' | Clean |
| 32 | '' | '' | OVE | '' | '' | '' | DHA 8 | '' | Clean |
| 33 | '' | '' | ACN | '' | '' | '' | DHA 8 | '' | Clean |
| 34 | '' | 84 | VOAc | 14 | '' | '' | DHA3P | 1 | Clean |
| 35 | '' | 72 | Styrene | 25 | '' | '' | DHA 8 | 2 | Clean |
| 36 | n-DDA | 95 | — | — | '' | '' | DHA 3 | 4 | Acceptable |
| 37 | n-DDA:nBA | 48.5:48.5 | — | — | '' | '' | DHA 8 | 2 | Acceptable |
| 38 | 2MBA:nBA | 53:44 | — | — | '' | '' | DHA 8 | '' | Clean |
| 39 | IOA | 89 | — | — | '' | '' | DHA 8 | 10 | Clean |

The following tabulated examples show pressure-sensitive adhesives which were prepared as in Examples 1–39 except for the use of a different external emulsifier. Each of the examples resembles Examples 3–10 in that (1) the acrylate monomer portion consists of 84 parts IOA and 13 parts IBA, one part of SEMNa is used as the emulsifier monomer, and 2 parts of a zwitterion monomer are included. Table II demonstrates the composition of the adhesives and the performance of pressure-sensitive adhesive tapes made therewith. Abbreviations have the same meanings previously assigned.

TABLE II

| Example | Zwitterion monomer | External emulsifier | Removability |
|---|---|---|---|
| 40 | DHA 8 | Sodium alkyl-aryl polyethoxy sulfate | Clean |
| 41 | '' | Sodium alkyl-aryl polyethoxy sulfonate | '' |
| 42 | '' | Sodium lauryl sulfate | '' |
| 43 | FBA:HCl | Alkyl polyoxyethylene dimethyl ammonium chloride | '' |

The following two examples show pressure-sensitive adhesives prepared as in preceding examples but employing a cationic emulsifier monomer and a cationic external emulsifier. The acrylate monomer system consisted of 78 parts by weight IOA and 13 parts by weight IBA. Also included were 2 parts by weight of DHA 8 zwitterion monomer, 1 part of the cationic emulsifier monomer and 6 parts by weight of the external emulsifier of Example 43. Results are shown below:

TABLE III

| Example | Emulsifier monomer | Removability |
|---|---|---|
| 44 | 3-methacryloxy-2-hydroxypropyl trimethyl ammonium chloride | Clean |
| 45 | methacryloxy ethyl trimethyl ammonium methosulfate | '' |

Although this invention has been particularly described with reference to masking tapes, it will be recognized that it can be embodied in the form of transparent film tapes, filament tapes, single- or double-coated foam tapes, transfer tapes, cloth-backed tapes, etc. It will likewise occur to those skilled in the art that other sheet material can be employed—e.g., wall coverings, labels, carpet squares, floor tile, solar control film, and the like.

What is claimed is:

1. In adhesive-coated sheet material comprising in combination a self-sustaining backing sheet having a layer of normally tacky and pressure-sensitive adhesive bonded to at least one face thereof,
    the improvement which comprises using as said adhesive a copolymer of monomers consisting essentially of
    a. from 88 to 99 parts by weight of at least one terminally unsaturated vinyl monomer, 70 to 100 weight percent of said vinyl monomer being selected from the class of non-tertiary alkyl acrylates wherein each alkyl group has at least half of its carbon atoms in a single chain and the average length of the alkyl chain is more than 4 and not more than 12,
    b. from 0.2 to 5 parts by weight of at least one vinyl-unsaturated, homopolymerizable emulsifier monomer which is a surfactant having both a hydrophobic and a hydrophilic moiety, contains at least 5 but not more than 40 carbon atoms and is nonionic and/or water-dispersible, and
    c. from 0 to 10 parts by weight of at least one zwitterion monomer having a free radically polymerizable unsaturated group,
    the total parts by weight of (b) plus (c) being at least 1 and not more than 12, and the total parts by weight of (a) plus (b) plus (c) being 100,
    whereby said adhesive-coated sheet material can be sufficiently firmly adhered to enameled or lacquered surfaces to satisfy the requirements of a masking tape and removed cleanly therefrom, even after exposure to heat, for example, 250°F. for 1 hour, and light.

2. The product of claim 1 wherein the adhesive-coated sheet material is normally tacky and pressure-sensitive adhesive tape which is capable of being wound convolutely upon itself in roll form, unwound therefrom without transfer of the adhesive to the opposite surface of the backing, and applied in a desired location.

3. The tape of claim 2 wherein the copolymer composition is such that the total parts by weight of (b) plus (c) is from 2 to 5.

4. The tape of claim 3 wherein the copolymer composition is such that the parts by weight of (b) is at least 1.

5. The tape of claim 4 wherein the terminally unsaturated vinyl monomer consists essentially of iso-octyl acrylate.

6. The tape of claim 5 wherein the terminally unsaturated vinyl monomer consists essentially of about 85 weight percent iso-octyl acrylate and about 15 weight percent isobutyl acrylate.

7. The tape of claim 6 wherein the copolymer contains about 1 part by weight emulsifier monomer and 2 parts by weight zwitterion monomer.

8. The tape of claim 7 wherein the emulsifier monomer is a salt of sulfoethyl methacrylate and the zwitterion monomer is 1,1-dimethyl-1-(2-hydroxyoctyl) amine methacrylimide.

9. The product of claim 2 wherein the pressure-sensitive adhesive tape product is masking tape.

10. The tape of claim 9 wherein the pressure-sensitive adhesive contains minor amounts of an external emulsifier.

* * * * *